United States Patent [19]

Ida et al.

[11] Patent Number: 4,978,864
[45] Date of Patent: Dec. 18, 1990

[54] MOISTURE DRAIN ARRANGEMENT FOR A VERTICAL SHAFT ENGINE STARTER

[75] Inventors: Masakatsu Ida; Arkira Morishita, both of Himeji, Japan

[73] Assignee: Mitsubishi Denki Kabushiki Kaisha, Tokyo, Japan

[21] Appl. No.: 375,802

[22] Filed: Jul. 5, 1989

[30] Foreign Application Priority Data

Jul. 6, 1988 [JP] Japan ............................ 63-89795[U]

[51] Int. Cl.⁵ .............................................. F02N 11/10
[52] U.S. Cl. ..................................................... 290/48
[58] Field of Search ................. 74/6, 7 R; 290/48; 310/88, 157

[56] References Cited

U.S. PATENT DOCUMENTS 4,677,407 6/1987 Tanaka et al. ...................... 335/202
4,718,290 1/1988 Murata et al. ......................... 74/7 A
4,886,306 12/1989 Tanaka et al. ........................ 290/48

Primary Examiner—A. D. Pellinen
Assistant Examiner—Robert Hoover
Attorney, Agent, or Firm—Sughrue, Mion, Zinn, Macpeak and Seas

[57] ABSTRACT

A moisture draining arrangement for a vertical shaft engine starter comprising a substantially cup-shaped rear bracket at the lower end of the starter and having a bottom wall including a water drain hole. The moisture draining arrangement further comprises a shield member disposed spaced apart from the bottom wall of the rear bracket but substantially directly below the drain hole thereby defining a substantially winding water flow passage to prevent splashed water from directly entering into the engine starter through the drain hole.

4 Claims, 2 Drawing Sheets

FIG. I
PRIOR ART
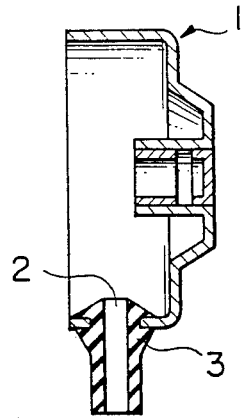
FIG. 2
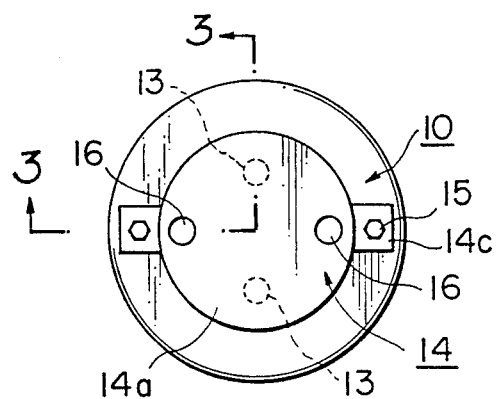
FIG. 3 ←A1>
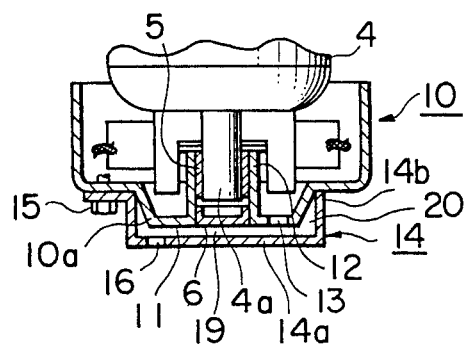

MOISTURE DRAIN ARRANGEMENT FOR A VERTICAL SHAFT ENGINE STARTER

BACKGROUND OF THE INVENTION

This invention relates to an engine starter and more particularly to a moisture drain structure for a vertical shaft engine starter.

The conventional engine starter for starting a vehicular internal combustion engine comprises a pinion engageable with an engine ring gear and a d.c. electric motor for driving the pinion. Such engine stater also comprises a front bracket on one end portion of the armature rotary shaft of the d.c. motor and a rear bracket on the other end portion of the armature rotary shaft. The front bracket is on the side of the armature rotary shaft on which the pinion is mounted. The engine starter is usually installed with its rotary shaft positioned horizontally.

Since the engine starter is mounted in an engine compartment when it is used in a vehicle, splashed water can easily enter into the starter through a clearance formed around the pinion when the vehicle crosses a shallow river or a water pool. The water or moisture thus entered into the interior of the engine starter must be drained.

FIG. 1 illustrates a rear bracket 1 used in a conventional engine starter of the horizontal shaft type provided with a moisture drain structure for draining the moisture entered into the engine starter as above discussed. It is seen from FIG. 1 that the rear bracket 1 has formed at its lower portion a moisture drain hole 2 into which a rubber tube 3 is inserted and attached by press-fit to extend downwardly. The rubber tube 3 attached to the drain hole 2 is for the purpose of preventing the water splashed by wheels or the like from the below from easily reaching the interior of the engine starter through the drain hole 2.

However, when the engine starter is to be installed with its armature rotary shaft of the d.c. electric motor oriented vertically, with the front bracket on the pinion side positioned at the upper portion and with the rear bracket at the lower portion, a question arises as to how the moisture drain structure should be arranged. This is because there is provided substantially no space below the rear bracket when the starter is vertically installed and therefore it is almost impossible to mount the rubber tube for preventing the ingress of splashed water from the below. Also, while a relatively large drain hole must be formed in the bottom wall of the rear bracket in order to attach the rubber tube, it is very difficult to find such a large wall area of the rear bracket bottom wall in which the large drain hole can be formed when the starter is vertically positioned.

SUMMARY OF THE INVENTION

Accordingly, one object of the present invention is to provide a moisture drain arrangement for a vertical shaft type engine starter in which moisture collected in the rear bracket can be effectively drained.

Another object of the present invention is to provide a moisture drain arrangement for a vertical shaft type engine starter with a compact moisture drain structure.

Still another object of the present invention is to provide a moisture drain arrangement for a vertical shaft type engine starter with a rear bracket with a moisture drain structure suitble for use in a vertical position.

With the above objects in view, the moisture drain arrangement for a vertical shaft engine starter of the present invention comprises a substantially cup-shaped rear bracket disposed at the lower end of the starter and having a bottom wall including a water drain hole and a shield member disposed spaced apart from the bottom wall of the rear bracket but substantially directly below the drain hole for substantially covering it to define a substantially winding water flowing passage.

BRIEF DESCRIPTION OF THE DRAWINGS

The present invention will become more readily apparent from the following detailed description of the preferred embodiments of the present invention taken in conjunction with the accompanying drawings, in which:

FIG. 1 is sectional side view of a rear bracket with a moisture drain arrangement suitable for use in a horizontal shaft type engine starter;

FIG. 2 is a front view of a rear bracket with a moisture drain structure of one embodiment of the present invention for use in a vertical shaft type engine starter;

FIG. 3 is a sectional side view of the rear bracket shown in FIG. 2 applied to a vertical shaft type engine starter taken along line 3—3 of FIG. 2;

DESCRIPTION OF THE PREFERRED EMBODIMENTS

Figure 4:
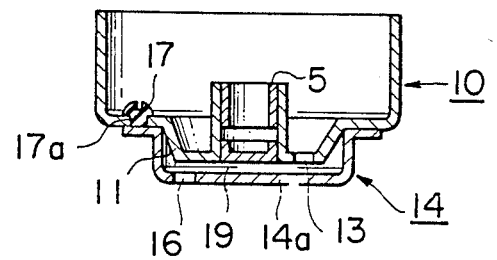
FIG. 4 is a sectional side view of the rear bracket with a moisture drain structure suitable for use in a vertical shaft type engine starter of another embodiment of the present invention.

FIGS. 2 and 3 illustrate a moisture draining arrangement for a vertical shaft engine starter of one embodiment of the present invention. Although not completely illustrated in the figures, the engine starter to which the moisture drain arrangement can be applied has a known basic structure and comprises a front bracket (not shown) on one end and a cup-shaped rear bracket 10 on the other end, and an armature rotary shaft 4a of a d.c. electric motor 4 for driving a pinion (not shown) which drives an engine ring gear (not shown) oriented in the vertical position. The cup-shaped rear bracket 10 has a bottom wall 11 which includes a central expanded portion or a lowered portion 10a formed by an annular step. The central lowered portion 10a has an inwardly extending tubular portion 12 in which a rear metal bearing 5 for rotatably supporting the armature rotary shaft 4a of the d.c. motor 4 is securely supported. A cap 6 is provided at the lower opening of the tubular portion 12 in order to prevent ingress of any foreign matter into the bearing 5.

As best seen from FIG. 2 the bottom wall 11 and more particularly the annular lowered portion 10a has a pair of water drain holes 13 formed in its bottom wall. The two drain holes 13 are diametrically oppositely separated. The drain holes 13 are positioned at the lowest position 10a in the rear bracket 10 so that all moisture in the engine starter can be collected and drained through the drain holes 13.

The moisture drain arrangement of the present invention further comprises a shield member 14 attached to the rear bracket 10 and including a bottom wall 14a held spaced apart from the bottom wall 11 of the rear bracket 10 but substantially directly below the drain holes 13 formed in the bottom wall 11 for defining a labyrinth or a water draining passage 19 winding in a serpentine manner. In the illustrated embodiment, the shield member 14 is a cup-shaped member having the circular bottom wall 14a and a cylindrical wall 14b extending from the circumference of the bottom wall 14a and attached to the bottom wall 11 of the rear bracket 10 by means of tubs 14c and mounting bolts 15 axially extending through the engine starter for securly assembling the d.c. motor yoke and the front and the rear brackets. The bottom wall 14a of the shield member 14 is separated from the bottom wall 11 of the rear bracket 10 to define a space 20 therebetween and has formed therein a pair of second drain holes 16 positioned in a staggered relationship with respect to the first-mentioned drain holes 13 formed in the rear bracket 10 as best seen in FIG. 2. In other words, the bottom wall 14a of the shield member 14 is spaced apart from the bottom wall 11 of the rear bracket 10 but is positioned substantially directly below the first drain holes 13. Thus, there is defined a water flow passage 19 extending from the interior of the rear bracket 10 to the exterior of the shield member 14 through the drain holes 13, the space 20 between the rear bracket 10 and the shield member 14 and through the second drain holes 16. It is to be noted that this water flow passage 19 is winding in a serpentine manner and has a large expanded space 20.

With the moisture drain structure of this embodiment, the moisture entering from the clearance around the pinion (not shown) into the engine starter collects at the rear bracket 10 where it is drained from the drain holes 13 formed in the bottom wall 11 of the rear bracket 10. The water from the first drain hole 13 falls on the bottom wall 14a of the shield member 14, flows along the bottom wall 14a and finally drained through the second drain hole 16 to the exterior. Thus, the first drain holes 13 in the rear bracket 10 are not directly exposed to the exterior by the bottom wall 14a of the shield member 14, so that splashed water from the below cannot reach the first drain holes 13 in the rear bracket 10 to enter into the interior of the engine starter.

Figure 5:
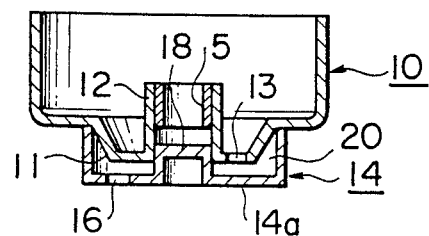
FIG. 5 is a sectional side view of the rear bracket with a moisture drain structure suitable for use in a vertical shaft type engine starter of still another embodiment of the present invention.

FIGS. 4 and 5 illustrate slightly modified embodiments of the moisture drain arrangement of the present invention. In FIG. 4, the shield member 14 is attached to the rear bracket 10 by press-fit plugs 17 securely attached to the the tubs 14c or a flange of the shield member 14 and elastically inserted into and engaged with holes 17a formed in the rear bracket 10. Thus, the shield member 14 is snap-fit onto the rear bracket 10. The shield member 14 shown in FIG. 5 has no tabs or flanges such as those shown in FIGS. 2 to 4. Instead, the shield member 14 comprises a hollow cylindrical plug 18 raised inwardly from the bottom wall 14a of the shield member 14. The tip of the plug 18 is snugly inserted into the central opening in the bottom wall 11 of the rear bracket 10, whereby the shield member 14 is attached to the rear bracket 10. In this arrangement, the space 20 defined between the rear bracket 10 and the shield member 14 is annular.

Alternatively, the shield member 14 may be a relatively small plate member slightly larger than the each drain hole 13 but disposed directly below the first drain hole 13 for preventing direct ingress of the splashed water from the below. Such a small plate member may be supported in a predetermined position by any suitable support means such as slats or grids allowing the moisture to escape therethrough.

As has been described, acccording to the present invention a moisture drain arrangement for a vertical shaft type engine starter comprises a substantially cup-shaped rear bracket at the lower end of the starter and having a bottom wall including a water drain hole, and a shield member disposed spaced apart from the bottom wall of the rear bracket but substantially directly below the drain hole, thereby defining a winding water flow passage to prevent splashed water from entering into the drain hole. Therefore, a moisture drain structure can be provided with a very small limited space and is suitable for use in a vertical shaft type engine starter in which measure for preventing the ingress of splashed water into the engine starter cannot be easily installed.

What is claimed is:

1. A moisture drain arrangement for a vertical shaft engine starter, comprising:
    a substantially cup-shaped rear bracket disposed at the lower end of the starter and including a bottom wall having a water drain hole; and
    shielding means disposed spaced apart from said bottom wall of said rear bracket but substantially directly below said drain hole for defining a substantially winding water draining passage.

2. A moisture draining arrangement for a vertical shaft engine starter as claimed in claim 1, wherein said shield member is a substantially cup-shaped member attached to said rear bracket and covering said drain hole in said rear bracket, said shield member having formed in a bottom wall thereof a second drain hole positioned in a staggered relationship with respect to said first-mentioned drain hole in said rear bracket.

3. A moisture draining arrangement for a vertical shaft engine starter as claimed in claim 1, wherein said rear bracket has two drain holes diametrically separated from each other and said shield member has two second drain holes diametrically separated from each other.

4. A moisture draining arrangement as claimed in claim 1, wherein said shield means comprises a shield plate disposed directly below said drain hole in said rear bracket and support means for supporting said shield plate relative to said rear bracket.

* * * * *